(12) United States Patent
Murata et al.

(10) Patent No.: US 8,725,379 B2
(45) Date of Patent: May 13, 2014

(54) VEHICLE BODY VIBRATION DAMPING CONTROL DEVICE

(75) Inventors: Toshiyuki Murata, Zama (JP); Yosuke Kobayashi, Yokohama (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 0 days.

(21) Appl. No.: 13/821,160

(22) PCT Filed: Jul. 26, 2011

(86) PCT No.: PCT/JP2011/066959
§ 371 (c)(1),
(2), (4) Date: Mar. 6, 2013

(87) PCT Pub. No.: WO2012/032870
PCT Pub. Date: Mar. 15, 2012

(65) Prior Publication Data
US 2013/0166165 A1    Jun. 27, 2013

(30) Foreign Application Priority Data
Sep. 7, 2010   (JP) ................................. 2010-199541

(51) Int. Cl.
| | | |
|---|---|---|
| *G06F 7/70* | (2006.01) | |
| *G06F 19/00* | (2011.01) | |
| *G06G 7/00* | (2006.01) | |
| *B60G 23/00* | (2006.01) | |
| *B62C 3/00* | (2006.01) | |
| *B62K 25/00* | (2006.01) | |
| *G06F 7/00* | (2006.01) | |
| *G06F 17/00* | (2006.01) | |

(52) U.S. Cl.
USPC ............................................... 701/70; 701/37

(58) Field of Classification Search
USPC ................................................ 701/37, 48, 70
See application file for complete search history.

(56) References Cited

U.S. PATENT DOCUMENTS

| | | | | | |
|---|---|---|---|---|---|
| 4,970,645 | A | * | 11/1990 | Adachi et al. ................... | 701/38 |
| 5,193,845 | A | | 3/1993 | Yokote et al. | |
| 2007/0045067 | A1 | * | 3/2007 | Schedgick et al. ............ | 188/266 |
| 2008/0249690 | A1 | * | 10/2008 | Matsumoto et al. ............ | 701/48 |

FOREIGN PATENT DOCUMENTS

| | | |
|---|---|---|
| JP | 63-251318 A | 10/1988 |
| JP | 4-87815 A | 3/1992 |
| JP | 7-52628 A | 2/1995 |
| JP | 2009-40163 A | 2/2009 |
| JP | 2009-247157 A | 10/2009 |

* cited by examiner

*Primary Examiner* — Imran Mustafa
(74) *Attorney, Agent, or Firm* — Foley & Lardner LLP

(57) ABSTRACT

In a vehicle body vibration damping control device, a priority level setting section is configured to set priority levels of a pitching vibration of a vehicle body which is a sprung mass and a bouncing vibration thereof to take a higher priority for a suppression of the pitching vibration between the pitching vibration and the bouncing vibration and a damping purpose braking-or-driving force correction quantity calculation section configured to determine a damping purpose braking-or-driving force correction quantity to suppress vehicle body vibrations on a basis of the pitching vibration and the bouncing vibration, while satisfying the priority levels set by the priority level setting section, to contribute onto a corrective control of a road wheel braking-or-driving force.

2 Claims, 6 Drawing Sheets

|  | PITCHING θp | BOUNCING Xb |
|---|---|---|
| BRAKING-OR-DRIVING TORQUE VARIATION ΔTw | Kt_p = 0.4 | Kt_b = -0.2 |
| FORWARD-OR-BACKWARD DIRECTION EXTERNAL DISTURBANCES ΔFf, ΔFr | Ks_p = 0.6 | Ks_b = -0.3 |

# VEHICLE BODY VIBRATION DAMPING CONTROL DEVICE

TECHNICAL FIELD

The present invention relates to a vehicle body vibration damping control device for suppressing vehicle body vibrations including a pitching vibration and a (vertical) bouncing vibration of the vehicle body which is a sprung mass of the vehicle on which road wheels are suspended via a suspension unit through a corrective control of a road wheel braking-or-driving force.

BACKGROUND ART

A patent document 1 exemplifies a conventional vehicle body vibration damping control device.

In this vehicle body vibration damping control technique, a vibration of a vehicle body which is a sprung mass of a suspension unit is estimated from a braking-or-driving torque and road wheel speeds, a braking-or-driving force correction quantity to suppress this vehicle body vibration is determined so that a vibration damping of the vehicle body is carried out with braking-or-driving torques for respective road wheels corrected by this correction quantity to perform the vibration damping.

PRE-PUBLISHED DOCUMENT

Patent Document
Patent document 1: Japanese Patent Application First Publication (tokkai) 2009-247157.

SUMMARY OF THE INVENTION

Incidentally, the pitching and bouncing vibrations of the vehicle body vibrations are correlated and cannot mutually independently be suppressed. The pitching vibration from among the vehicle body vibrations has a tendency of enlarging a line of sight movement of a vehicle driver so that a large influence is given to a vehicular comfortablity and to fatigue of the vehicle driver.

However, in the conventional vehicle body vibration damping control device as proposed by the above-described technique, the braking-or-driving force correction quantity is merely determined to suppress the pitching and bouncing vibration without consideration of the above-described circumference and the road wheel braking-or-driving torque is merely corrected by this correction quantity. Therefore, such a problem is raised that the pitching and bouncing vibrations cannot be suppressed at predetermined priority levels and, due to an insufficient suppression of the pitching vibration, the line of sight movement of the driver becomes large so that the worsening of the vehicular driving comfortablity and the fatigue of the driver are enlarged.

In order to solve the above-described problem, the pitching and bouncing vibrations are tried to be respectively suppressed optimally, large man-hours such as a large quantity of simulations and repeated experiments are required. The structure cannot help being complicated. Hence, it is not actual practice due to its excessively high cost, in any case.

It is, hence, an object of the present invention to provide a vehicle body vibration damping control device in which a priority level is provided between the pitching (vibration) and the bouncing (vibration) so as to enable an elimination of the above-described problem, a worsening of the comfortablity of the vehicle due to the insufficient suppression of the pitching vibration and an increase in fatigue of the driver can be eliminated and, thus, an improvement in the comfortablity and relieving of fatigue can be achieved, without resort to a tremendous amount of man-hours and at a low-cost with a simple structure.

In order to achieve this object, the vehicle body vibration damping control device according to the present invention is constituted by the following:

First, the vehicle body vibration damping device which is a prerequisite for the present invention will now be explained. This control device suppresses the vehicle body vibrations including the pitching and bouncing vibrations of the vehicle body which is the sprung mass of the vehicle on which the road wheels are suspended via the suspension unit through the corrective control of the road wheel braking-or-driving force.

According to the present invention, the vehicle body vibration suppression control device described above comprises: a vehicle body vibration estimation section configured to estimate the pitching vibration and the bouncing vibration; a priority level setting section configured to set priority levels of the pitching vibration and the bouncing vibration to take a higher priority for a suppression of the pitching vibration between the pitching vibration and bouncing vibrations; and a damping purpose braking-or-driving force correction quantity calculation section configured to determine a damping purpose braking-or-driving force correction quantity to suppress the vehicle body vibrations on a basis of the pitching vibration and the bouncing vibration, while satisfying the priority levels set by the priority level setting section, to contribute onto the corrective control of the road wheel braking-or-driving force.

According to the vehicle body vibration damping control device described above, the damping purpose braking-or-driving force correction quantity is determined to suppress the vehicle body vibrations on a basis of the pitching vibration and the bouncing vibration while taking the higher priority for the suppression of the pitching vibration rather than the bouncing vibration, the road wheel braking-or-driving force is corrected by this correction quantity, and the vehicle body vibration damping control to suppress the pitching vibration and the bouncing vibration is carried out.

As described above, the suppression of the pitching vibration is set to be higher priority than the bouncing vibration so that the insufficient suppression of the pitching vibration does not occur and the above-described problem such that the vehicle comfortability due to the insufficient suppression of the pitching vibration becomes worsened and the fatigue of the driver becomes large can be solved.

In addition, the suppression priority levels between the pitching vibration and the bouncing vibration are set to realize the above-described solution of problem.

Without resort to the tremendous amount of man-hours, the above-described improvement in the comfortability and the relieving of the fatigue of the driver can be realized.

EMBODIMENTS TO CARRY OUT THE INVENTION

Figure 1:
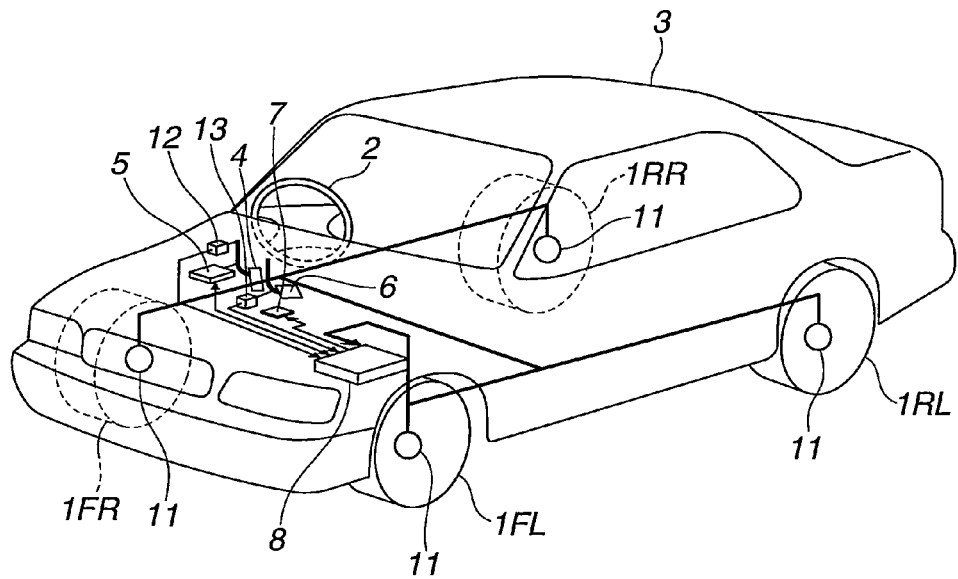
FIG. 1 is a rough configuration view representing a vehicle mounted state of a vehicle body vibration damping control device in a preferred embodiment according to the present invention.

Hereinafter, detailed description of a preferred embodiment according to the present invention will be described in details on a basis of the preferred embodiment shown in the drawings.

<Structure of the Preferred Embodiment>

Figure 2:
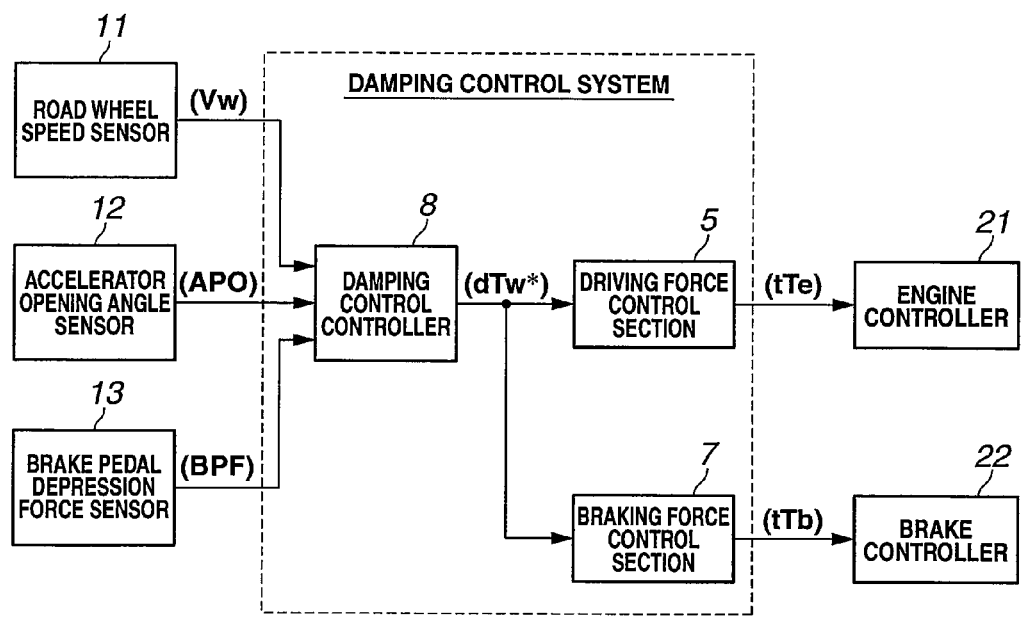
FIG. 2 is a functional block diagram representing a rough configuration of the vehicle body damping control device in the preferred embodiment according to the present invention.

FIGS. 1 and 2 are rough configuration views representing a vehicle body vibration damping control device which is the preferred embodiment according to the present invention. In FIG. 1, 1FL, 1FR denote left and right front road wheels and 1RL, 1RR denotes left and right rear road wheels. Left and right front road wheels 1FL, 1FR are steered wheels steered (turned) by means of a steering wheel 2. In addition, left and right front road wheels 1FL, 1FR and left and right rear road wheels 1RL, 1RR are suspended on a vehicle body 3 via a suspension unit not shown. This vehicle body 3 is placed at a more upper position than the suspension unit and constitutes a sprung mass.

An engine not shown as a power source is mounted in a vehicle shown in FIG. 1 so that left and right front road wheels 1FL, 1FR are driven via an automatic transmission not shown to provide a travelable front wheel drive vehicle.

An output of the engine is adjusted via an engine controller 21 in accordance with a depression quantity of an accelerator pedal 4 manipulated by the driver. In addition to this, the output can be corrected according to engine controller 21 via a driving force control section 5 (for the vehicle body vibration damping purpose) in order to suppress the vehicle body vibration.

On the other hand, the vehicle shown in FIG. 1 is provided with a liquid pressure brake system not shown including a brake pedal 6. Road wheels 1FL, 1FR 1RL, 1RR are braked by means of the liquid pressure brake systems via a brake controller 22 shown in FIG. 2 in accordance with a depression force of brake pedal 6 to enable the deceleration and the stop of the vehicle. In this addition, the braking force can be corrected by means of brake controller 22 via damping force control section 7 to suppress the vehicle body vibrations.

A driving force control section 5 calculates a damping purpose target engine torque tTe to achieve the vehicle body vibration suppression in response to a damping purpose driving torque correction quantity command dTw* from damping control controller 8 as shown in FIG. 2 when the above-described vehicle body vibration damping suppression driving force correction is carried out, as shown in FIG. 2.

Then, engine controller 21 performs the engine output control to make the engine torque coincide with this damping target engine torque tTe.

A braking force control section 7 calculates a damping purpose target braking torque tTb to achieve the vehicle body vibration suppression in response to a damping purpose braking-or-driving torque correction quantity command dTw* from damping control controller 8 as shown in FIG. 2 when the above-described vehicle body damping suppression driving force correction is carried out. Brake controller 22 performs the brake liquid pressure control such that the braking torque is made coincident with this damping purpose target braking torque tTb so that the correction of the above-described damping purpose braking force is made.

Damping control controller 8 inputs signals from road wheel speed sensors 11 to individually detect road wheel speeds Vw of left and right front road wheels 1FL, 1FR and left and right road wheels 1RL, 1RR, a signal from an accelerator pedal opening angle sensor 12 to detect an accelerator opening angle (accelerator pedal depression quantity) APO, and a signal from a brake pedal depression force sensor 13 to detect a brake pedal depression force BPF, in order to determine damping purpose braking-or-driving torque correction quantity command dTw*.

Figure 3:
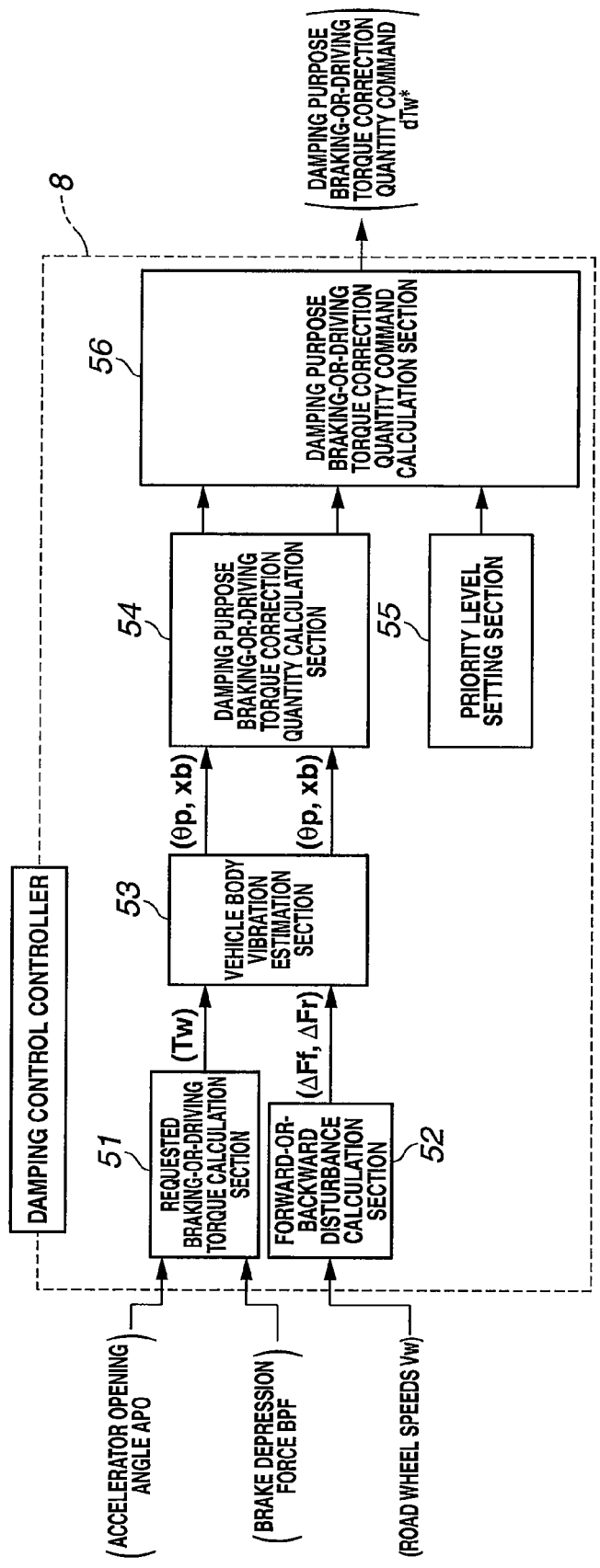
FIG. 3 is a functional block diagram representing a damping control controller shown in FIGS. 1 and 2.

Damping control controller 8 is, as shown in a block diagram of FIG. 3, constituted by a requested braking-or-driving torque calculation section 51, a forward-or-backward (or longitudinal) (direction external) disturbance calculation section 52, a vehicle body vibration estimation section 53, a damping purpose braking-or-driving torque correction quantity calculation section 54, a priority level setting section 55, and a damping purpose braking-or-driving torque correction quantity command calculation section 56.

Requested braking-or-driving torque calculation section 51, as will be described later, calculates a road wheel requested braking-or-driving torque Tw that the driver has requested from accelerator opening angle APO and brake pedal depression force BPF, as will be described below. Forward-or-backward (direction external) disturbance calculation section 52 calculates, as will be described later, monitors a variation in each of road wheel speeds based on road wheel speeds Vw and calculates forward-or-backward direction external disturbances ΔFf, ΔFr acted upon the front road wheels and the rear road wheels from the variation in each of the road wheel speeds.

Vehicle body vibration estimation section 53, as will be described later, estimates the vibrations (pitching vibration θp and bouncing vibration xb) of vehicle body 3 along with a variation in requested braking-or-driving torque Tw and the vibration of vehicle body 3 (pitching vibration θp and bouncing vibration xb) along with forward-or-backward (direction external) disturbances ΔFf, ΔFr from the variation in requested braking-or-driving torque Tw and road wheel forward-or-backward direction external disturbances ΔFf, ΔFr derived in calculation section 52.

Damping purpose braking-or-driving torque correction quantity calculation section 54 calculates a damping purpose braking-or-driving torque correction quantity, as will be described later, required to suppress the vibrations (pitching vibration θp and bouncing vibration xb) of vehicle body 3 along with a variation in requested braking-or-driving torque Tw and the vibrations of vehicle body 3 (pitching vibration θp and bouncing vibration xb) along with forward-or-backward direction external disturbances ΔFf, ΔFr calculated by estimation section 53.

Priority level setting section 55 corresponds to a priority level setting section in the present invention. As will be described later, the priority levels between the suppression of pitching vibration θp and the suppression of bouncing vibration xb are set.

Damping purpose braking-or-driving torque correction quantity command calculation section 56 calculates a final damping purpose braking-or-driving torque correction quantity command dTw* to suppress the vibration of vehicle body 3 (pitching vibration θp and bouncing vibration xb) while the suppression priority levels set by setting section 55 is satisfied on a basis of the damping purpose braking-or-driving torque correction quantity required to suppress the vibrations (pitching vibration θp and bouncing vibration xb) of vehicle body 3 along with the variation in requested braking-or-driving torque Tw and the vibration of vehicle body 3 (pitching vibration θp and bouncing vibration xb) along with forward-or-backward direction (external) disturbances ΔFf, ΔFr. Hence, damping purpose braking-or-driving torque calculation section 56 corresponds to a damping purpose braking-or-driving force correction quantity calculation section in the present invention.

A driving force control section 5 and a damping force control section 7 constituting a damping control system as shown in FIG. 2 together with damping control controller 8 constituted by above-described requested braking-or-driving torque calculation section 51, forward-or-backward (longitudinal) (direction external) disturbance calculation section 52, vehicle body vibration estimation section 53, and damping purpose braking-or-driving torque correction quantity command calculation section 56 will be described below.

Figure 4:
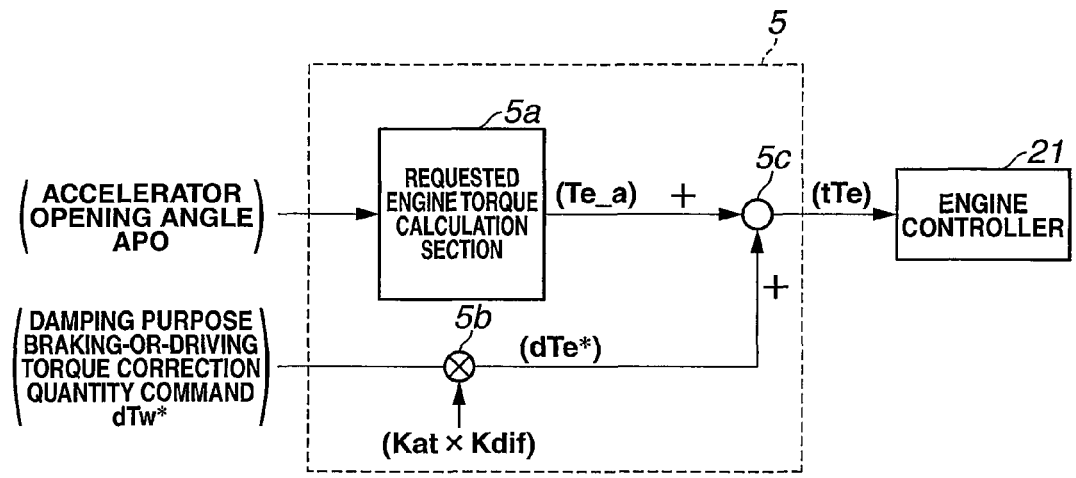
FIG. 4 is a functional block diagram of a driving force control section shown in FIG. 2.

Driving force control section 5, as shown in FIG. 4, does not determine a damping purpose target engine torque tTe in a case where damping purpose braking-or-driving torque correction quantity command dTw* is the braking torque correction quantity command (the correction quantity of the driving torque is a negative value) but entrusted for the engine to be under an ordinary control by engine controller 21 and, only in a case where damping purpose braking-or-driving torque correction quantity command dTw* is the driving torque correction quantity command (a positive value of the correction quantity of the driving torque), determines damping purpose target engine torque tTe, as will be described below, and commands damping purpose target engine torque tTe to engine controller 21.

Driving force control section 5 first calculates requested engine torque Te_a that the driver has requested from accelerator opening angle APO at a requested engine torque calculation section 5a when damping purpose target engine torque tTe is calculated.

Figure 5:
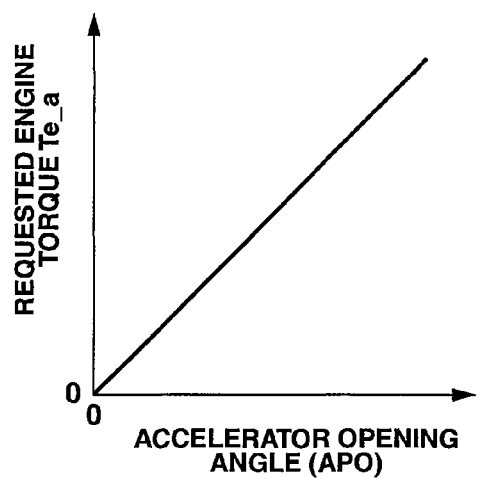
FIG. 5 is a characteristic diagram exemplifying a relationship between an accelerator opening angle APO and a requested engine torque Te_a that the driver has requested.

When this calculation is carried out, requested (demanded) engine torque Te_a is determined and searched on a basis of a preset scheduled map as illustrated in FIG. 5. Then, a multiplier 5b multiplies a gear ratio Kat of the automatic transmission and a differential final gear ratio Kdif of the differential gear by damping purpose driving torque correction quantity command dTw* to determine damping purpose engine torque correction quantity dTe* to determine damping purpose engine torque correction quantity dTe*.

Next, an adder 5c adds above-described requested engine torque Te_a and damping purpose engine torque correction quantity dTe* to determine damping purpose engine torque correction quantity tTe (tTe=Te_a+dTe*) to issue this damping purpose driving torque tTe to engine controller 21 to be served under the vibration damping control.

Figure 6:
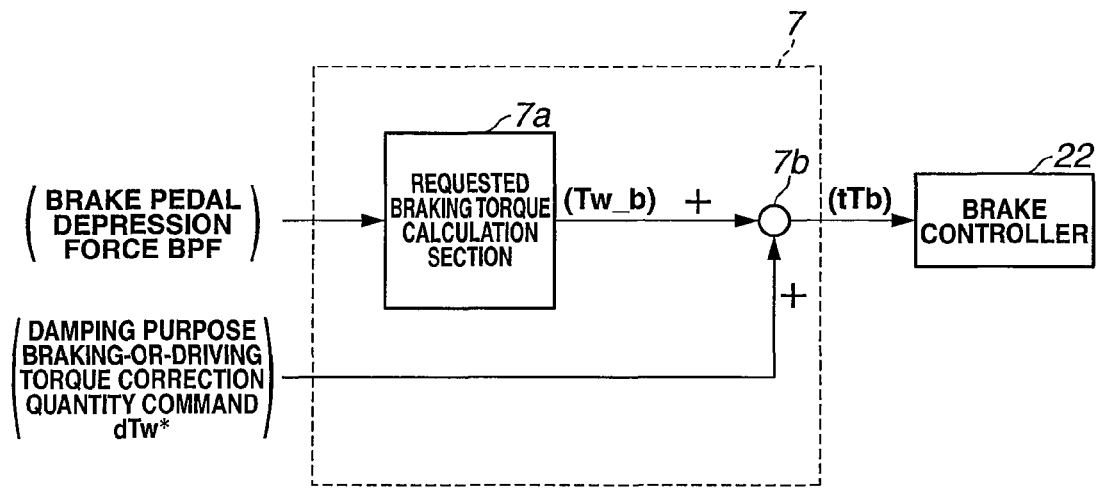
FIG. 6 is a functional block diagram of a driving force control section shown in FIG. 2.

Braking force control section 7 is, as shown in FIG. 6, if damping purpose braking-or-driving torque correction quantity command dTw* is the driving torque correction quantity command (a negative value of the correction quantity of the braking torque). The liquid pressure brake system is entrusted to the ordinary control by means of brake controller 22. Only in a case where damping purpose braking-or-driving torque correction quantity command dTw* is the braking torque correction quantity command (the correction quantity of the braking torque is a positive value), damping purpose target braking torque tTb is determined to be commanded to brake controller 21 as will be described below.

Figure 7:
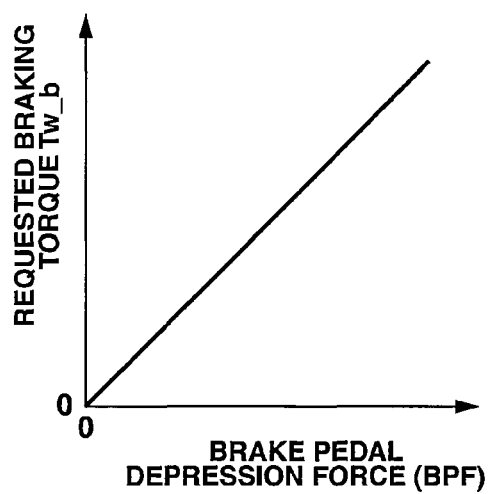
FIG. 7 is a characteristic diagram illustrating a relationship between brake pedal depression force BPF and a requested braking torque Tw_b.

Braking force control section 7 calculates requested braking toque Tw_b that the driver has requested from brake pedal depression force BPF in requested braking torque calculation section 7a when calculating damping purpose target braking torque tTb. When this requested braking torque calculation is carried out, demanded damping torque Tw_b is searched and determined on a basis of a preset scheduled map as illustrated in FIG. 7.

Then, an adder 7b adds above-described demanded braking torque Tw_b and damping purpose driving torque correction quantity command dTw* to determine a damping purpose target braking torque tTb (tTb=Tw_b+dTw*). This is commanded to brake controller 22 to be serviced under the damping control.

<Vehicle Body Vibration Damping Vibration>

Figure 8:
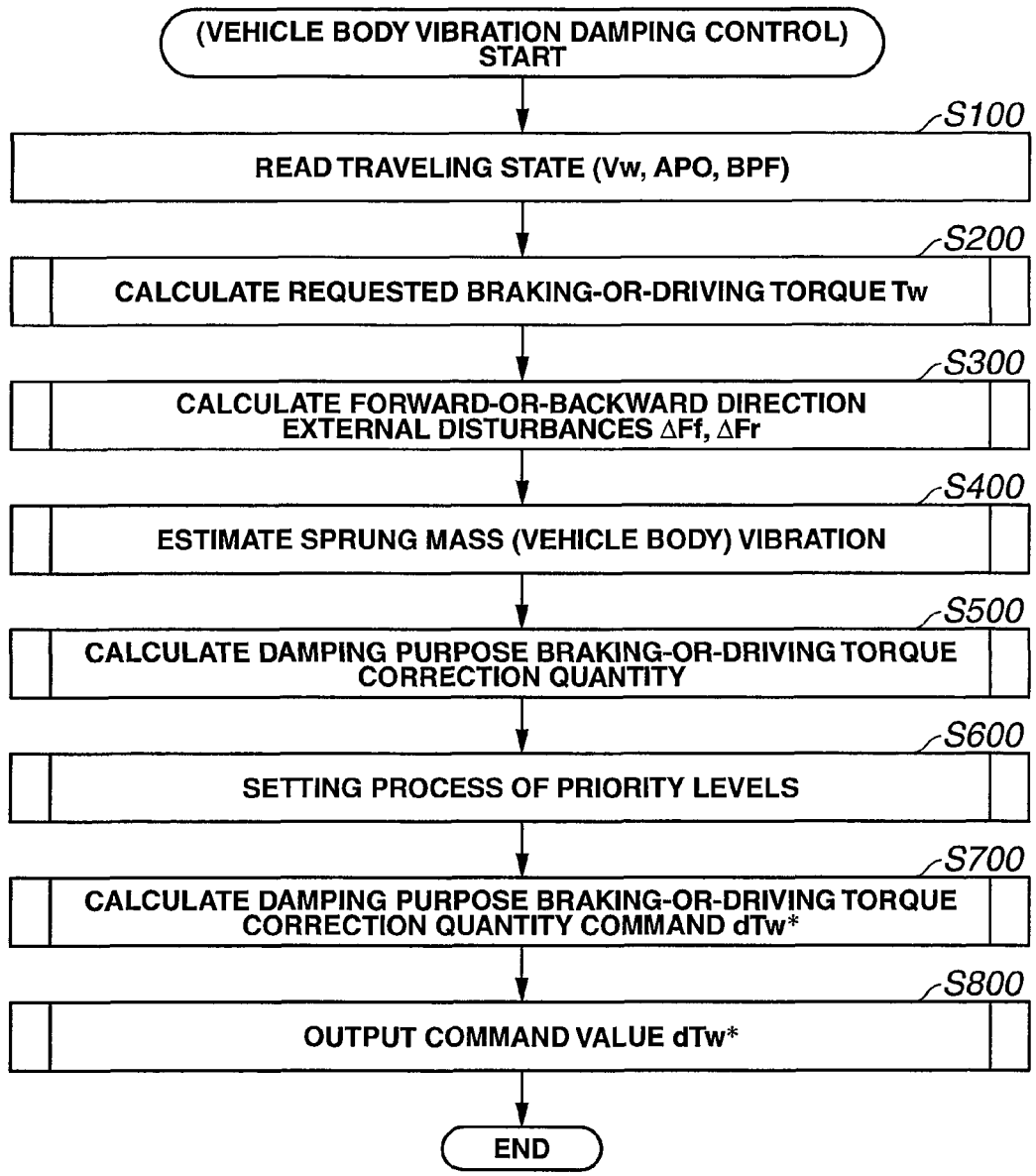
FIG. 8 is a flowchart representing a vibration damping control program by which the damping control controller shown in FIGS. 2 and 2 executes.

Damping control controller 8 shown in FIGS. 2 and 3 carries out a vehicle body vibration damping control to suppress the vehicle body vibration by executing a control program shown in FIG. 8. The flowchart of FIG. 8 is repeatedly executed for each of 10 msec. At a step S100, damping control controller 8 reads a vehicle traveling state including road wheel speeds Vw detected by sensor 11, accelerator opening angle APO detected by sensor 12, and a brake pedal depression force BPF detected by sensor 13.

At the next step S200 (requested braking-or-driving torque calculation section 51), requested braking-or-driving torque Tw is calculated as follows on a basis of the read vehicle traveling state. At first, requested engine torque Te_a that the driver has requested from accelerator opening angle APO is searched and determined from accelerator opening angle APO on a basis of the preset scheduled engine torque map shown in FIG. 5. Then, requested engine torque Te_a is converted into a driving shaft torque on a basis of differential gear ratio Kdif and gear ratio Kat of the automatic transmission and this converted value provides requested driving torque Tw_a as follows:

$$Tw\_a = Te\_a/(Kdif \cdot Kat)$$

Next, requested braking torque Tw_b that the driver has requested is searched from brake pedal depression force BPF on a basis of the scheduled map illustrated in FIG. 7 and calculates demanded braking-or-driving torque Tw using the following equation from this requested braking torque Tw_b and above-described demanded driving torque Tw_a.

$$Tw = Tw\_a - Tw\_b$$

At the next step S300 (forward-or-backward (direction external) disturbance calculation section 52), damping control controller 8 calculates a front road wheel running resistance variation ΔFf and a rear road wheel running resistance variation ΔFr which are the forward-or-backward direction external disturbances which provides inputs to a vehicular motion model, as will be described later, from front left and right road wheel speeds VwFL, VwFR and rear left and right rear road wheels 1RL, 1RR (of road wheel speeds Vw).

When the calculation of these running resistance variations ΔFf and ΔFr is carried out, each road wheel speed is calculated with an actual vehicle speed component Vbody eliminated from each road wheel speed VeFL, VwFR, VwRL, VwRR. Each road wheel acceleration is calculated according to a time derivative which takes a difference between the present value and the old value of a corresponding one of road wheel speeds and is multiplied by a sprung mass to calculate front road wheel running resistance variation ΔFf and rear road wheel running resistance variation ΔFr.

At a step S400 (vehicle body vibration estimation section 53), damping control controller 8 estimates the sprung vibration (vehicle body vibration) from a vehicle motion model, as will be described later.

When this estimation is made, damping control controller 8 estimates the sprung mass vibration (vehicle body vibration) using the vehicular motion model with requested braking-or-driving torque Tw determined by step S200 and front-and-rear road wheel running resistance variations ΔFf, ΔFr determined at step S300 as the inputs of step S400.

The vehicle motion model in this embodiment is a front-and-rear two wheel model having the front and rear road wheels suspended with respect to vehicle body 3 through a suspension unit.

That is to say, the vehicular motion model in this embodiment, with driving torque variation A Tw generated on the vehicle, front road wheel running resistance variation ΔFf and rear road wheel running resistance variation ΔFr generated in accordance with a road surface state change, a braking-or-driving force change, a steering operation, and so forth as parameters, includes: a suspension model having a spring-damper system of the suspension unit corresponding to one of the front and rear road wheels; and a vehicle body sprung model expressing a movement of a weight center position of the vehicle body.

Next, in a case where the braking-or-driving torque variation occurs on the vehicle and a running resistance variation occurs by applying at least one of the road surface state change, braking-or-driving force variation, and the steering operation onto each of tire wheels, the vehicle body vibration using the vehicular motion model will be described below.

When at least one of driving torque variation ΔTw and running resistance variations ΔFr, ΔFr is generated on vehicle body 3, a revolution of an angle (a pitch angle) θp about a pitch axle is developed, and a bouncing movement vb is developed on a weight center. It should be noted that driving torque variation ΔTw is calculated from a difference between a present driving torque variation $\Delta Tw_n$ calculated from the accelerator (pedal) operation by a driver and a previous value $Tw_{n-1}$ of the driving torque variation.

Figures 9, 10:
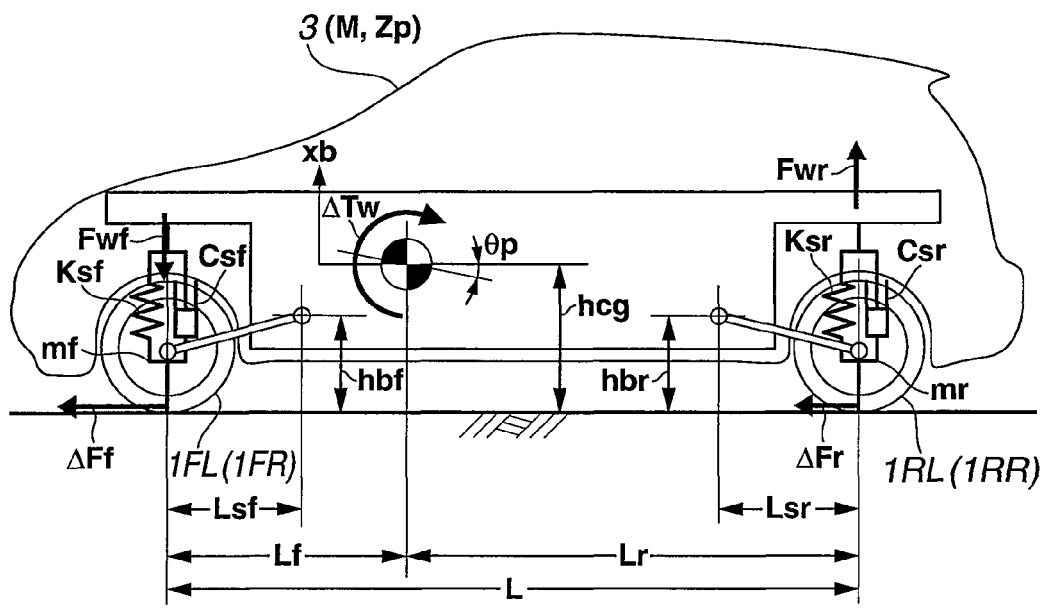
FIG. 9 is an explanatory view for explaining a vehicular motion model used in a vehicle body vibration damping control in FIG. 8.
FIG. 10 is a map view for priority levels related to suppression priority levels Kt_p, Ks_b of pitching vibration θp and bouncing vibration xb along with a requested braking-or-driving torque ΔTw and for priority levels related to suppression priority levels Ks_p, Kt_b of pitching vibration θp and bouncing vibration xb along with a forward-or-backward direction external disturbance ΔFf, ΔFr, the priority levels being set in a priority level setting section of FIG. 3.

As shown in FIG. 9, a spring constant of front road wheel side suspension unit is assumed to be Ksf, a vibration damping constant is assumed to be Csf, a spring constant of rear road wheel side suspension unit is assumed to be Ksr, a vibration damping constant is assumed to be Csr, a link length of the front road wheel side suspension unit is assumed to be Lsf, a link swing center height is assumed to be hbf, a link length of the rear road wheel side suspension unit is assumed to be Lsr, a link swing center height is assumed to be hbr, a distance between a front axle and the pitch axle is assumed to be Lr, a weight center height is assumed to be hcg, and the sprung mass is assumed to be M, a motion equation of the vehicle body bouncing vibration is described as follows:

$$M \cdot \ddot{x}b = -Ksf(xb+Lf \cdot \theta p)-Csf(\dot{x}b+Lf \cdot \dot{\theta}p)-Ksr(xb-Lr \cdot \theta p)-Csf(\dot{x}b-Lr \cdot \dot{\theta}p)-(hbf/Lsf)\Delta Ff+(hbr/Lsr)\Delta Fr \quad \text{[Equation 1]}$$

In addition, the motion equation of the vehicle body pitching vibration can be expressed as follows:

$$Ip \cdot \ddot{\theta}p = -Lf \cdot Ksf(xb+Lf \cdot \theta p) - \\ Lf \cdot Csf(\dot{x}b+Lf \cdot \dot{\theta}p)+Lr \cdot Krs(\dot{x}b-Lr \cdot \dot{\theta}p)+ \\ Lr \cdot Csf(xb-Lr \cdot \theta p)-\{hcg-(Lf-Lsf)hbf/Lsf)\} \\ \Delta Ff + \{hcg-(Lr-Lsr)hbr/Lsr\}\Delta Fr \quad \text{[Equation 2]}$$

If these two motion equations are substituted as $$x_1=x_b, x_2=\dot{x}_b, x_3=\theta p, x_4=\dot{\theta}p \quad \text{[Equation 3]}$$

If equation 2 is converted into a state equation using equation 3, the following state equation 4 can be expressed.

$$\dot{x}=Ax+Bu$$

These elements are expressed as follows:

$$A = \begin{bmatrix} 0 & 1 & 0 & 0 \\ ab1 & ab2 & ab3 & ab4 \\ 0 & 0 & 1 & 0 \\ bb1 & bb2 & bb3 & bb4 \end{bmatrix},$$

$$B = \begin{bmatrix} 0 & 0 & 0 \\ p1 & p2 & 0 \\ 0 & 0 & 0 \\ p3 & p4 & q \end{bmatrix},$$

$$x = \begin{bmatrix} xb \\ \dot{x}b \\ \theta p \\ \dot{\theta}p \end{bmatrix}$$

$$u = \begin{bmatrix} \Delta Ff \\ \Delta Fr \\ \Delta Tw \end{bmatrix}$$

$ab1=-(Ksf+Ksr)/M$ $ab2=-(Csf+Csr)/M$ $ab3=-(Lf \cdot Ksf-Lr \cdot Ksr)/M$ $ab4=-(Lf \cdot Csf-Lr \cdot Csr)/M$ $bb1=-(Lf \cdot Ksf-Lr \cdot Ksr)/I_p$ $bb2=-(Lf \cdot Csf-Lr \cdot Csr)/I_p$ $bb3=-(Lf^2 \cdot Ksf+Lr^2 \cdot Ksr)/I_p$ $bb4=-(Lf^2 \cdot Csf+Lr^2 \cdot Csr)/I_p$ $p1=-hbf/M/Lsf$ $p2=hbr/M/Lsr$ $p3=hcg/I_p-(Lf-Lsf)hbf/Lsf/I_p$ $p4=hcg/I_p-(Lr-Lsr)hbr/Lsr/I_p$ $q=1/Ip$ Furthermore, the above-described state equation is divided into a feed-forward (F/F) term and a feedback (F/B) term according to the input signal, the feed-forward (F/F) term with the driving torque as the input can be expressed as follows:

$$\dot{x} = Ax + B_{FF} \cdot \Delta Tw, \quad \text{[Equation 6]}$$

$$B_{FF} = \begin{bmatrix} 0 \\ 0 \\ 0 \\ q \end{bmatrix}$$

In addition, feedback term (F/B) with the forward-or-backward running disturbances as the inputs can be expressed as follows:

$$\dot{x} = Ax + B_{FB} \cdot \begin{bmatrix} \Delta Ff \\ \Delta Fr \end{bmatrix}, \quad \text{[Equation 7]}$$

$$B_{FB} = \begin{bmatrix} 0 & 0 \\ p1 & p2 \\ 0 & 0 \\ p3 & p4 \end{bmatrix}$$

If x in equation 7 is determined, bouncing vibration (d/dt)xb and pitching vibration (d/dt) θp of the vehicle body sprung portion (vehicle body) can be estimated according to forward-or-backward direction external disturbances ΔFf, ΔFr and the braking-or-driving torque variation ΔTw.

At the next step S500 (damping purpose braking-or-driving force torque correction quantity calculation section 54), damping purpose driving-or-driving torque correction quantity dTw* to suppress vehicle body vibrations (d/dt)xb and (d/dt) θp calculated as described above at step S400 is calculated.

In details, at step S500, damping purpose braking-or-driving torque correction quantity dTw* to be fed-back to requested braking-or-driving torque Tw is calculated from the sprung mass (vehicle body) vibrations expressed in the following equation (8) based on variation component ΔTw of requested braking-or-driving torque Tw determined on a basis of accelerator opening angle APO and brake pedal depression force BPF at step S200.

$$[x_1\ x_2\ x_3\ x_4]^T \quad \text{[Equation 8]}$$

At this time, a feedback gain is determined so that bouncing vibration (d/dt)xb and pitching vibration (d/dt) θp are made small.

A weighting matrix is selected as follows:

$$Q_{xb\_FB} = \begin{bmatrix} 1 & 0 & 0 & 0 \\ 0 & 3e10 & 0 & 0 \\ 0 & 0 & 1 & 0 \\ 0 & 0 & 0 & 1 \end{bmatrix}, \quad \text{[Equation 9]}$$

$$R_{xb\_FB} = \begin{bmatrix} 1 & 0 \\ 0 & le15 \end{bmatrix}$$

Then, $$J = \int_0^\infty (x^T(t)Q_{xb\_FB}x(t) + u^T(t)R_{xb\_FB}u(t))dt \quad \text{[Equation 10]}$$

a control input which minimizes J expressed in equation (10) may be calculated.

The solution is given with algebraic Riccati's equation expressed as follows:

$$A^T p + pA - pBR_{xb\_FB}^{-1}B^T p + Q_{xb\_FB} = 0 \quad \text{[Equation 11]}$$

With a positive symmetrical solution p as a basis, the following equation (12) is given:

$$u(t) = -F_{xb\_FB}x(t),\ F_{xb\_FB} = R_{xb\_FB}B^T p \quad \text{[Equation 12]}$$

In equation (12), $F_{xb\_FB}$ is a feedback gain matrix related to bouncing vibration (d/dt)xb of the feed-forward term.

Pitching vibration (d/dt) θp in the feedback term and feedback gains ($F_{thp\_FB}$, $F_{xb\_FF}$, $F_{thp\_FF}$) which make (d/dt)xb, (d/dt) θp in the feedback term small can equally be calculated.

Feedback gain $F_{thp\_FB}$ such that the vibration of (d/dt) θp in the feedback term is reduced is calculated with a weighting matrix defined as follows:

$$Q_{thp\_FB} = \begin{bmatrix} 1 & 0 & 0 & 0 \\ 0 & 1 & 0 & 0 \\ 0 & 0 & 1 & 0 \\ 0 & 0 & 0 & 5e10 \end{bmatrix}, \quad \text{[Equation 13]}$$

$$R_{thp\_FB} = \begin{bmatrix} 1 & 0 \\ 0 & le15 \end{bmatrix}$$

$$F_{thp\_FB} = R_{thp\_FB}B^T P \quad \text{[Equation 14]}$$

In the same way, a feedback gain $F_{xb\_FF}$ such that (d/dt)xb in the feed-forward term becomes reduced is calculated as in the following equation 16 with the weighting matrix assumed as:

$$Q_{xb\_FF} = \begin{bmatrix} 1 & 0 & 0 & 0 \\ 0 & 1e9 & 0 & 0 \\ 0 & 0 & 1 & 0 \\ 0 & 0 & 0 & 1 \end{bmatrix}, R_{xb\_FF} = [1] \quad \text{[Equation 15]}$$

$$F_{xb\_FF} = R_{xb\_FF}B^T P \quad \text{[Equation 16]}$$

In addition, feedback gain $F_{thp\_FF}$ such that (d/dt)xb and (d/dt) θp in the feed-forward term are reduced is calculated as in the following equation (18) with the weighting matrix as follows:

$$Q_{thp\_FF} = \begin{bmatrix} 1 & 0 & 0 & 0 \\ 0 & 1 & 0 & 0 \\ 0 & 0 & 1 & 0 \\ 0 & 0 & 0 & 1e9 \end{bmatrix}, R_{xb\_FF} = [1] \quad \text{[Equation 17]}$$

$$F_{thp\_FF} = R_{thp\_FF}B^T P \quad \text{[Equation 18]}$$

The above-described damping purpose braking-or-driving torque correction quantity dTw* is calculated using a technique of an optimal regulator but may be designed using another technique such as a pole assignment.

At the next step S600 (priority level setting section 55), damping control controller 8 sets suppression priority levels for pitching vibration θp and bouncing vibration xb generated by requested braking-or-driving torque variation ΔTw estimated on a basis of requested braking-or-driving torque Tw at step S400 (damping purpose driving-or-braking torque correction quantity calculation section 54) and pitching vibration θp and bouncing vibration xb generated by forward-or-backward direction external disturbances ΔFf, ΔFr estimated on a basis of road wheel speeds Vw at the same step S400 (damping purpose braking-or-driving torque correction quantity calculation section 54), respectively, as shown in FIG. 10.

Hence, step S600 corresponds to priority level setting section according to the present invention.

In details, suppression priority level Kt_p of pitching vibration θp is assumed as 0.4 and suppression priority level Kt_b of bouncing vibration xb is assumed as −0.2, for pitching vibration θp and bouncing vibration xb along with requested braking-or-driving torque variation ΔTw and suppression priority level Ks_p of pitching vibration θp is assumed as 0.6 and suppression priority level Ks_b of bouncing vibration xb is assumed as −0.3, for pitching vibration θp and bouncing vibration xb along with forward-or-backward direction external disturbances ΔFf, ΔFr.

The suppression levels of priority are set as follows. That is to say, the positive value means the direction toward which the vibration is suppressed and as the positive value becomes larger, the priority level of the vibration suppression becomes higher. The negative value means the direction in which the vibration is in an over-vibration state and, as an absolute value of the suppression priority level becomes larger, the level of the over-vibration becomes larger.

Hence, at step S600 (priority level setting section 55), as appreciated from FIG. 10, for both of pitching vibration θp and bouncing vibration xb along with requested braking-or-driving torque variation ΔTw and pitching vibration θp and bouncing vibration xb along with forward-or-backward direction external disturbances ΔFf, ΔFr, damping control controller 8 commands to take a higher priority for the suppression of pitching vibration θp than the suppression of bouncing vibration xb.

In addition, at step S600 (priority level setting section 55), as appreciated from FIG. 10, the higher priority is set for the suppression of pitching vibration θp and the priority level of suppression of pitching vibration θp along with forward-or-backward direction external disturbances ΔFf, ΔFr is set to be higher than the priority level of suppression of pitching vibration θp along with requested braking-or-driving torque variation ΔTw.

At the next step S700 (damping purpose braking-or-driving torque correction quantity command calculation section 56), damping control controller 8 calculates damping purpose braking-or-driving torque correction quantity command ΔTw* to suppress pitching vibration θp and bouncing vibration xb along with requested braking-or-driving torque variation ΔTw estimated from requested braking-or-driving torque Tw and to suppress pitching vibration θp and bouncing vibration xb along with forward-or-backward direction external disturbances ΔFf, ΔFr estimated from road wheel speeds Vw, while the priority level is satisfied, on a basis of the damping purpose braking-or-driving torque correction quantity set at step S600 (priority level setting section 55) using the following equation.

Hence, step S700 corresponds to damping purpose braking-or-driving force correction quantity calculation section in the present invention.

$$dT_w^* = Kt\_p \cdot F_{thp\_FF} + Kt\_b \cdot F_{xb\_FF} + Ks\_p \cdot F_{thp\_FB} + KS\_b \cdot F_{xb\_FB}$$ [Equation 19]

At a last step S800, damping control controller 8 outputs damping purpose braking-or-driving torque correction quantity command dTw* calculated from the above-described equation at step S700 to driving force control section 5 shown in FIG. 2 and braking force control section 7.

Driving force control section 5, as described hereinabove with reference to FIG. 4, calculates requested engine torque Te_a from accelerator opening angle APO at a calculation section 5a, multiplies gear ratio Kat of an automatic transmission and a gear ratio Kdif of a differential gear by damping purpose driving torque correction quantity command dTw* to determine a requested engine torque correction quantity dTe* at multiplier 5b, and adds requested engine torque Te_a to damping purpose engine torque correction quantity dTe* at adder 5c to determine damping purpose target engine torque tTe. Determined damping purpose target engine torque tTe is commanded to engine controller 21.

Braking force control section 7, as described before with reference to FIG. 6, calculates requested braking torque Tw_b from brake pedal depression force BPF, in a case where damping purpose braking-or-driving torque correction quantity command dTw* is the driving torque correction quantity command and, at adder 7b, adds requested braking torque Tw_b and damping purpose braking torque correction quantity command dTw* to determine damping purpose target engine torque tTb which is commanded to brake controller 22.

In a case where damping purpose braking-or-driving torque correction quantity command dTw* is the driving torque correction quantity command, engine controller 21, upon receipt of damping purpose target engine torque tTe from driving force control section 5, makes the engine torque coincident with damping purpose target engine torque tTe to realize damping purpose braking-or-driving torque correction quantity command dTw*.

In addition, in a case where damping purpose braking-or-driving torque correction quantity command dTw* is the braking torque correction quantity command, brake controller 22, upon receipt of damping purpose target braking torque tTb from damping force control section 7, makes a road wheel braking force coincident with this damping purpose target braking torque tTb to realize damping purpose braking-or-driving torque correction quantity command dTw*.

As described above, pitching vibration θp and bouncing vibration xb along with requested braking-or-driving torque variation ΔTw estimated from requested braking-or-driving torque Tw at step S400 (damping purpose braking-or-driving torque correction quantity calculation section 54) and pitching vibration θp and bouncing vibration xb along with forward-or-backward direction external disturbances ΔFf, ΔFr estimated from road wheel speeds Vw at the same step S600 (priority level setting section 55) can be suppressed in the way as the priority levels set at step S600 (priority level setting section 55).

<Effect of Preferred Embodiment>

According to the vehicle body vibration damping control device in the preferred embodiment, damping purpose braking-or-damping torque correction quantity command dTw* is realized through the above-described engine torque command or the braking torque control to suppress pitching vibration θp and bouncing vibration xb of vehicle body 3. In this case, at step S600 in FIG. 8 (priority level setting section 55 in FIG. 3), as shown in FIG. 10, suppression priority levels Kt_p, Ks_p on pitching vibration θp are set to be higher than suppression priority levels Kt_b, Ks_b of bouncing vibration xb. Hence, no generation of suppression insufficiency of pitching vibration θp occurs and the problem such that the sight line movement of the vehicle driver due to the insufficient suppression of the pitching vibration becomes large so that the vehicle comfortability and the fatigue of the vehicle driver becomes large can be eliminated.

In addition, the level of suppression priority is set between pitching vibration θp and bouncing vibration xp to realize the above-described solution of problem. Hence, the realization of the above-described solution of problem can be achieved without resort to a great number of man-hours such as the tremendous amount of simulations and experiments and at the low cost with a simple structure.

In addition, as described above, the higher priority is set to the suppression of pitching vibration θp than the suppression of bouncing vibration xb. At this time, as shown in FIG. 10, at step S600 in FIG. 8 (namely, priority level setting section 55 in FIG. 3), since the higher priority for the suppression priority level Ks_p of pitching vibration θp along with forward-or-backward direction external disturbances ΔFf, ΔFr estimated on a basis of road wheel speeds Vw is set than the suppression priority level Kt_p of pitching vibration θp along with torque variation ΔTw estimated on a basis of requested braking-or-driving torque Tw, the following effects can also be achieved.

That is to say, according to the setting of the priority levels as described above, pitching vibration θp along with torque variation ΔTw is not suppressed to the level of pitching vibration θp along with forward-or-backward direction external disturbances ΔFf, ΔFr. It should be noted that pitching vibration θp along with torque variation ΔTw includes the pitching vibration along with the torque variation due to the acceleration/deceleration operation through accelerator pedal 4 by the driver and, if pitching vibration θp along with torque variation ΔTw is forcibly suppressed in the same way as pitching vibration θp along with forward-or-backward direction external disturbances ΔFf, ΔFr, a vehicle body pitching motion is generated having a magnitude such that the driver expects at a time of acceleration-or-deceleration of the vehicle. From this vehicle body pitching motion, an acceleration/deceleration feeling corresponding to the acceleration/deceleration operation cannot be perceived by the driver.

With the above-described inconvenience in mind, in the preferred embodiment, suppression priority level Kt_p of pitching vibration θp along with torque variation ΔTw estimated on a basis of requested braking-or-driving torque Tw is not set to be higher than suppression priority level Ks_p of pitching vibration θp along with forward-or-backward direction external disturbances ΔFf, ΔFr estimated on a basis of road wheel speeds Vw. Hence, pitching vibration θp along with torque variation ΔTw is not suppressed to the pitching vibration θp along with forward-or-backward direction external disturbances ΔFf, ΔFr. The vehicle body pitching motion having the magnitude such that the driver expects at the time of acceleration-or-deceleration by the driver can be generated so that the acceleration-or-deceleration feeling corresponding to the acceleration/deceleration operation can be perceived by the driver from this vehicle body pitching motion and no unpleasant feeling is given.

Furthermore, in the preferred embodiment, when the priority level setting which takes the higher priority for the suppression of pitching vibration θp than the suppression of bouncing vibration xb is set, the pitching vibration is suppressed by positive suppression priority levels Kt_p, Ks_p, as shown in FIG. 10, at step S600 in FIG. 8 (priority level setting section 55 in FIG. 3) and the bouncing vibration is increased by negative suppression priority levels Kt_p, Ks_p and the bouncing vibration is increased according to the negative suppression priority levels −Kt_b, −Ks_b. Hence, since the difference in the priority level between the suppression of bouncing vibration xb (actually, augmented) and the suppression of pitching vibration θp can largely be set so that the above-described action and effect can, furthermore, be remarkable. In this way, in the preferred embodiment, the suppression priority levels of the bouncing vibration are set to negative values −Kt_b, −Ks_b so as to accurately eliminate the insufficient suppression of the pitching vibration so that the priority levels are set in the direction such that the bouncing vibration dares to be increased However, the present invention is not limited to this. The suppression priority level of the bouncing vibration may be set to positive values of Kt_p, Ks_p provided that the suppression priority level of the bouncing vibration is smaller than suppression priority level Kt_p, Ks_p of the pitching vibration and the priority levels may be set to the direction in which the bouncing vibration is substantially suppressed.

<Other Embodiments>

In the above-described embodiment, the vehicle body damping control device has been explained which suppresses the vehicle body vibration according to the correction of the engine torque in the vehicle in which the engine such as the internal combustion engine is mounted. However, it is natural that the vehicle body vibrations are suppressed by correcting the driving force of a rotary electric machine, in the electric automotive vehicle or hybrid vehicle in which the rotary machine such as the motor provides the driving (power) source.

Furthermore, in the illustrated example, the liquid pressure brake system is controlled when the braking force is added or subtracted for the vibration suppression. However, in an electrically driven vehicle such as the electric automotive vehicle or the hybrid vehicle, it is natural that a regenerative braking force of the rotary electric machine may be added or subtracted for the damping suppression.

The invention claimed is:

1. A vehicle body vibration damping control device for suppressing vibrations of a vehicle body, which is a sprung mass of the vehicle on which road wheels are suspended via a suspension unit, through a corrective control of a road wheel braking or driving force, the vehicle body vibration damping control device comprising:

a vehicle body vibration estimation section configured to:
estimate a first pitching vibration of the vehicle body based on requested braking or driving torque,
estimate a first bouncing vibration of the vehicle body based on the requested braking or driving torque,
estimate a second pitching vibration of the vehicle body based on speeds of road wheels, and
estimate a second bouncing vibration of the vehicle body based on the speeds of road wheels;

a priority level setting section configured to:
set suppression priority levels for each of the first pitching vibration, the first bouncing vibration, the second pitching vibration, and the second bouncing vibration,
set the suppression priority levels for the first and second pitching vibrations to be higher than the suppression priority levels for the first and second bouncing vibrations, and
set the suppression priority level for the second pitching vibration to be higher than the suppression priority level for the first pitching vibration; and a damping purpose braking-or-driving force correction quantity calculation section configured to determine a damping purpose braking or driving force correction quantity to suppress the vibrations of the vehicle body, the braking or driving force correction quantity being determined based on the suppression priority levels set by the priority level setting section, such that suppression of pitching vibrations is prioritized over suppression of bouncing vibrations, and suppression of a pitching vibration caused by forward or backward direction external disturbance is prioritized over suppression of a pitching vibration caused by requested braking or driving torque variation.

2. The vehicle body vibration damping control device as claimed in claim 1, wherein the priority level setting section is configured to set the priority levels such that the pitching vibrations are suppressed, and bouncing vibrations are increased.

\* \* \* \* \*